Patented Jan. 17, 1939

2,144,220

UNITED STATES PATENT OFFICE 2,144,220

AROMATIC AMINES AND METHODS FOR THEIR PREPARATION

Robert E. Etzelmiller, Wilmington, Del., assignor to E. I. du Pont de Nemours & Company, Wilmington, Del., a corporation of Delaware No Drawing. Application August 17, 1933, Serial No. 685,640

15 Claims. (Cl. 260—329)

This invention relates to new aromatic amines and more particularly refers to mono-acyldiamines having the following general formula: Z—CONH—Arylene—NH$_2$ in which Z represents the residue of a heterocyclic compound and Arylene represents the residue of an aromatic amine.

It is an object of this invention to prepare new organic compounds. A further object is to prepare new aromatic amines which are especially suitable for use in the manufacture of ice colors. A still further object is to produce aromatic amines which have a variety of uses, particularly in the production of dyes and pigments. Additional objects will become apparent from a consideration of the following description.

These objects are attained according to the herein described invention which in its preferred embodiment comprises reacting a nitro-amine, azo-amine or amino-sulfaminic acid of the benzene or naphthalene series with a carboxylic acid halide of the furane or thiophene series, and converting the resulting product to the mono-acyldiamine by reduction or other suitable and well known reactions, according to the manner in which the product is produced.

The invention may be more readily understood by a consideration of the following illustrative examples, in which the quantities are stated in parts by weight:

Example 1

*Furoyl-p-phenylene-diamine.*—A mixture of

| | Parts |
|---|---|
| p-Nitraniline | 13.8 |
| Benzene | 200.0 |
| Potassium carbonate (dry) | 16.0 |
| Furoyl chloride | 16.0 | was refluxed with stirring for 6–7 hours. Approximately 100 parts of water were added and the mixture allowed to cool. The 4-nitro-1-furoylamino-benzene was separated by filtration and washed with acetone to remove any unchanged p-nitraniline. The nitro body was reduced by boiling with—

| | Parts |
|---|---|
| Water | 150 |
| Iron | 25 |
| Acetic acid | 5 |

When the reduction was complete, the mixture was made slightly alkaline with soda ash and filtered. The amine was extracted from the iron sludge by an appropriate organic solvent such as alcohol or acetone. It precipitated as a slightly colored solid on dilution with water. The new base has the probable formula:

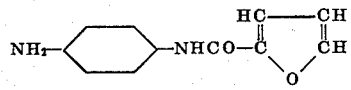

Example 2

*2-furoylamino-5-amino-toluene.*—15.2 parts of 5-nitro-2-amino-toluene were condensed with furoyl chloride as in Example 1. After washing the condensation product with warm acetone and crystallizing from alcohol, white crystals melting at 166° C. were obtained. The nitro body was reduced by hydrogenation in methyl alcohol at 100° C. using a reduced nickel catalyst. The mixture was filtered hot to remove the catalyst. After removing most of the alcohol by distillation, the amine was precipitated as a white solid by the addition of water. It has the probable formula:

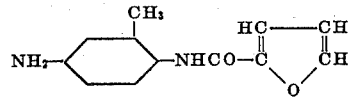

Example 3

*2-furoylamino-5-amino-anisole.*—16.8 parts of 5-nitro-2-amino-anisole were condensed with furoyl chloride as in Example 1. The condensation product was crystallized from acetone and water. White crystals melting at 181–2° C. were obtained. Reduction was carried out as in Example 1, yielding slightly colored crystals melting at 124° C. The new amine has the probable formula:

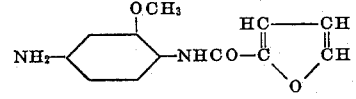

Example 4

*4-furoylamino - 2 - 5 - dimethoxy-aniline.*—19.8 parts of 4-nitro-2-5-dimethoxy-aniline were dissolved in a small amount of acetone and finely precipitated by pouring into 600 parts of water. The mixture was heated to 60° C. and a solution of—

| | |
|---|---|
| Furoyl chloride | 22 parts in |
| Carbon tetrachloride | 100 parts | was added, the mixture being well agitated, and a slight alkalinity (to Brilliant Yellow papers) maintained by the addition of soda ash. The carbon tetrachloride was expelled by heating to 85° C., the condensation product filtered off and recrystallized from acetone and water. It was a light yellow solid melting at 174° C. The nitro body was reduced by hydrogenation as in Example 2, yielding the new base of the probable formula:

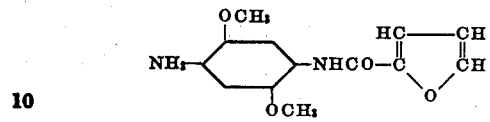

Example 5

*4 - furoylamino - 2 - 5 - diethoxy-aniline.*— 17.3 parts of sulfanilic acid, dissolved in 150 parts of water containing 5.3 parts of sodium carbonate, were diazotized at 10–15° C. by adding 30 parts of hydrochloric acid (30%) and a solution of 6.9 parts of sodium nitrite in 25 parts of water.

18.1 parts of diethoxyaniline were dissolved at 70–75° C. in 150 parts of water and 12.5 parts of hydrochloric acid (30%) and added to the above diazo solution, the temperature being maintained at 15–20° C. by the addition of ice. The mineral acidity was neutralized by the addition of sodium acetate; and after stirring 20–30 minutes, the coupling was complete.

The coupling product was dissolved by adding sodium hydroxide solution until slightly alkaline. 16–18 parts of furoyl chloride were then added and 14–16 parts of sodium carbonate dissolved in water were also added as necessary to maintain a slight alkalinity. When the condensation was complete, the mixture was salted 10–15% and filtered.

The press cake was dissolved in hot water and added to 30 parts of iron, 150 parts of water and 5–10 parts of formic acid at 100–103° C. When the reduction was complete, the mixture was made alkaline with soda ash, filtered and washed. The iron sludge was extracted with acetone or alcohol and the amine precipitated as slightly colored crystals by the addition of water. The new product has the probable formula:

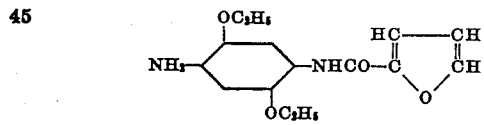

Example 6

*X-chlorofuroylamino-2-5-dimethoxy-aniline.*— 112 parts of furoic acid were refluxed gently for 3–4 hours with an excess of sulfuryl chloride. The chlorinated furoyl chloride was separated from the excess of sulfuryl chloride by distillation. Distillation range 196–220° C.

A mixture of—

| | Parts |
|---|---|
| 4-nitro-2-5-dimethoxy-aniline | 10 |
| Potassium carbonate (dry) | 18 |
| Benzene | 200 |
| X-chloro-furoyl chloride | 20 | was refluxed with stirring for 3–4 hours. The benzene was removed by steam distillation and the condensation product, which separated, was purified by dissolving in acetone and precipitating by the addition of water. The nitro body was reduced in methyl alcohol by hydrogenation at 100° C. using a reduced nickel catalyst. When the reduction was complete, the hot mixture was filtered to remove the catalyst. Most of the alcohol was then removed by distillation and the free base obtained as slightly colored crystals by adding water and allowing the mixture to cool. The new product has the probable formula:

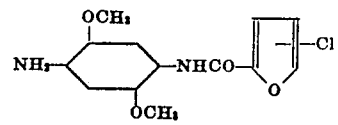

Example 7

*Furoyl-m-phenylene-diamine.*—13.8 parts of m-nitraniline were condensed with furoyl chloride as in Example 1. The nitro body was crystallized from acetone and water; yielding white crystals melting at 147–8° C. The reduction was carried out as in Example 1; yielding a white crystalline solid, M. P. 142–3° C. The new base has the probable formula:

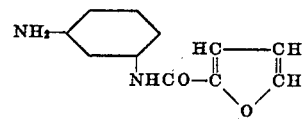

Example 8

*3-furoylamino-4-chloro-aniline.*— 17.25 parts of 6-chloro-3-nitro-aniline were condensed with furoyl chloride as in Example 1. The condensation product was crystallized from acetone and water (M. P. 180–3° C.); then reduced with iron and acetic acid as in Example 1, yielding fine white crystals melting at 169–171° C. The new base has the probable formula:

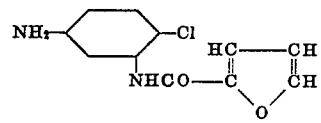

Example 9

*2-furoylamino-4-amino-anisole.*—16.8 parts of 4-nitro-2-amino-anisole were condensed with furoyl chloride as in Example 1. The nitro body appeared as white crystals, when crystallized from acetone and water, which melted at 165° C. A white crystalline solid, M. P. 133–4° C., was obtained on reduction with iron and acetic acid as in Example 1. The new base has the probable formula:

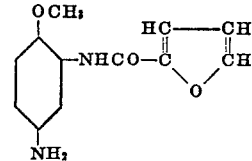

Example 10

*4-furoylamino-2-amino-toluene.*—15.2 parts of 2-nitro-4-amino-toluene were condensed with furoyl chloride as in Example 1. White crystals were obtained upon crystallizing the product from acetone and water, which melted at 126° C. A white crystalline solid, M. P. 116–117° C., was obtained on reduction with iron and acetic acid. The new amine has the probable formula:

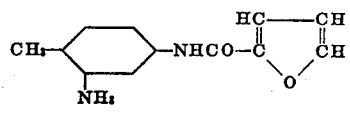

Example 11

2-(3'-methyl-thenoylamino)-5-amino-toluene. Preparation of X-iodo-3-methyl-thiophene.—To a solution of—

| | Parts |
|---|---|
| 3-methyl-thiophene | 40.8 parts |
| Benzene | 45.0 parts | the following substances were added alternately and in small portions:

| | Parts |
|---|---|
| Yellow mercuric oxide | 75 |
| Iodine | 109 |

During the addition, the mixture was well agitated and cooled as necessary in a bath of ice water. The mixture was filtered and the mercuric iodide, which separated, washed with a little ether. The solvents were removed by distillation and the crude X-iodo-3-methyl-thiophene was purified by vacuum distillation. B. P. 99–101° C./23–5 mm.

Preparation of 3-methyl-thiophene-X-carboxylic acid.—By adding the iodo compound to magnesium in dry ether (Grignard reaction), passing in dry carbon dioxide, and decomposition with ice and water, the magnesium salt of 3-methyl-thiophene-X-carboxylic acid was formed. The ether was removed by steam distillation, the resulting solution clarified and the free acid precipitated by the addition of hydrochloric acid. It was purified by reprecipitating from a solution of its sodium salt. M. P. 146–7° C.

The above acid was converted to the acid chloride by refluxing with an excess of thionyl chloride. B. P. 120–4° C./30 mm.

A mixture of—

| | Parts |
|---|---|
| 5-nitro-2-amino-toluene | 10 |
| Benzene | 150 |
| Potassium carbonate | 15 |
| 3-methyl-thiophene-X-carbonyl chloride | 15 | was refluxed, with stirring, for 6–7 hours. Approximately 100 parts of water were added and the mixture allowed to cool. The condensation product was filtered and washed with acetone to remove any free amine. The nitro body was reduced with iron and acetic acid using the method of Example 1, yielding a white crystalline solid melting at 107–108° C. The product has the probable formula:

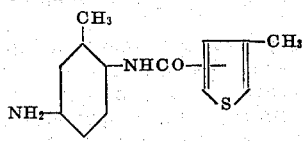

Example 12

4-(3'-methyl-thenoylamino)-2-5-dimethoxy-aniline.—10 parts of 4-nitro-2-5-dimethoxy-aniline were dissolved in 45 parts of pyridine and 12–14 parts of 3-methyl-thiophene-X-carbonyl chloride slowly added. After heating 10–15 minutes at 90–100° C., the condensation product was precipitated by the addition of water. It was filtered and washed with acetone. The reduction was carried out with iron and acetic acid as before, and the iron sludge extracted with alcohol. On diluting with water, an oily precipitate formed which slowly changed to a gray crystalline solid. The new amine has the probable formula:

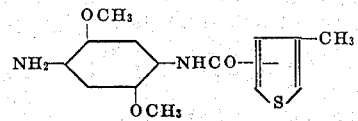

Example 13

4-furoylamino-2-5-diethoxy-aniline. Preparation of 2-5-diethoxy-furoylamino-benzene.—A mixture of—

| | Parts |
|---|---|
| 2-5-diethoxy-aniline | 18.1 |
| Benzene | 150.0 |
| Potassium carbonate (dry) | 16.0 |
| Furoyl chloride | 16.0 | was refluxed with stirring for 4 hours. The benzene was then removed by steam distillation, and the furoylated amino compound which separated was purified by crystallization from alcohol and water. The intermediate has the formula:

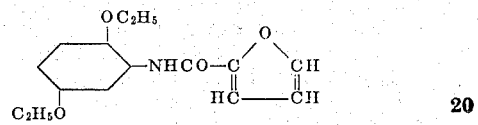

4-furoylamino-2-5-diethoxy-nitro-benzene.—A solution of—

| | |
|---|---|
| 2-5-diethoxy-furoylamino-benzene | 27.5 parts in |
| Acetic acid (glacial) | 300.0 parts | was treated at 20° C. with nitric acid (70%) _____ 9.7 parts

A crystalline nitro body slowly separated during the addition of the nitric acid. After all the nitric acid was added, the mixture was warmed to 30° C. for 1 hour and then diluted with 1000 parts of water, filtered, and washed free of acid. The product had the probable formula:

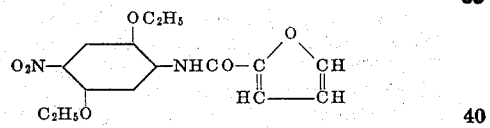

4-furoylamino-2-5-diethoxy-aniline.—The 4-furoylamino-2-5-diethoxy-nitrobenzene obtained above was reduced by hydrogenation in methyl alcohol at 100° C. using a reduced nickel catalyst. After removing most of the alcohol by distillation, the amine was precipitated as a gray crystalline solid by the slow addition of water. It has the probable formula:

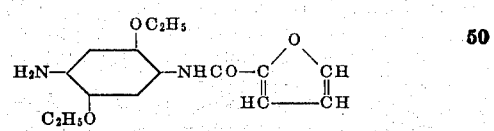

The term "Arylene" used in the foregoing examples designates a radical of the aromatic series from which two hydrogens have been removed, leaving two valences to which reactive groups may be, or are, joined.

It is to be understood that the aforementioned examples are based upon the use of a relatively few of the numerous compounds which come within the scope of the present invention. For instance, while the selection of an aromatic amine of the benzene or naphthalene series in general gives superior results, nevertheless aromatic amines of other polynuclear isocyclic series may be used with satisfactory results. Representative compounds selected from the aforementioned polynuclear series are amines of the anthracene, phenanthrene, and fluorene series, although other members belonging to the polynuclear isocyclic series have been used with good results. Furthermore, these aromatic amines may have substituted thereon one or more substituents such as the alkyl, alkoxy, aryloxy, nitro and halogen groups. Where the resulting products are to be used in the production of ice colors it is advisable to select compounds which are free from water-solubilizing radicals such as the carboxylic and sulfonic acid groups. With the exception of these water-solubilizing groups the aromatic amines may have one or more of the numerous well known radicals substituted thereon without appreciably detracting from the advantages of this invention. A few of the radicals which fall within this category have been mentioned, but it is understood that these substituents are not the only ones which may be utilized.

By the term "a compound of the benzene series" is meant an aromatic compound having a benzene nucleus and such substituents appended thereto as are customarily found in the dyestuff components of the prior art.

The heterocyclic compounds adapted hereto may also be selected from among numerous well known classes. As previously mentioned compounds of the furane and thiophene series are preferable, but the invention is not restricted thereto, various other heterocyclic compounds being suitable. For example, in place of compounds of the furane and thiophene series heterocyclic members of the oxazole, thiazole, pyrazole, imidazole, pyrrole, pyrane, pyridine, piperidine, pyrimidine, benzothiazole, quinoline, and acridine series may be used with surprisingly good results. These compounds may likewise have substituted thereon one or more groups. Where the object in view is the production of ice colors water-solubilizing groups should be absent therefrom. With the exception of members containing such solubilizing groups compounds having a wide range of substituents may be selected. Among the substituents which may be present on such heterocyclic compounds mention may be made of the following: alkyl, alkoxy, aryloxy, nitro and halogen groups, it being understood that these groups are not mutually exclusive of the numerous well known non-water-solubilizing substituents which are comprised herein.

The arylamines described herein may be made according to the usual chemical methods wherein it is desired to produce mono-acyl derivatives of aromatic diamines. The following reactions are the most common for this purpose, although they do not represent the only reactions which are adapted to such use:

(1) A nitro-arylamine is treated with the acid halide of a heterocyclic carboxylic acid, the chloride being preferred. This results in condensation to the nitro-arylide of the heterocyclic carboxylic acid. The aforementioned acylation reaction may in some instances be carried out in water suspension, usually in the presence of an acid-binding agent such as sodium acetate, sodium bicarbonate, sodium carbonate, sodium hydroxide, pyridine, etc. It may also be effected by dissolving and/or suspending the nitroarylamine in an inert organic solvent, and treating with the acid halide of the heterocyclic carboxylic acid, again preferably in the presence of an acid-binding agent. The nitro compound resulting from such acylation reaction is then reduced to the desired amine by well known processes, such as by the action of iron in the presence of ferrous or other salts, by the action of a metal such as tin or zinc in the presence of an acid, by the action of sodium sulfide or sulfhydrate, or by liquid phase hydrogenation over a suitable catalyst in the presence of a solvent or diluent.

(2) The arylamines comprised herein may be coupled with the diazo salt obtained from a second arylamine which preferably contains a water-solubilizing group, it being understood that the arylamine selected for this purpose must be capable of coupling with diazo salts. The monoazo compound thereby obtained is then treated in aqueous solution or suspension with the acid halide of the heterocyclic carboxylic acid, preferably in the presence of an acid-binding agent. This results in acylation of the free amino group. The acylated monoazo compound may then be reduced according to well known methods, a few of which were previously described. The desired arylamine which results is readily separated from the solubilized arylamine, filtration usually being sufficient to accomplish such separation. This method of producing new aromatic amines results in the production of products wherein the arylene residue previously referred to is a para-arylene radical, as coupling takes place in the "4-position" with respect to the amino group. Since this invention includes arylene residues having the amino groups in ortho, meta or para position to each other it is clear that the aforementioned process is not applicable to the production of all the compounds comprised herein.

(3) Mono-sulfaminic acids of arylamines may be prepared, for example by the processes described in U. S. Patent 1,878,543. These products may then be treated, preferably in the presence of acid-binding agents with the acid halide of heterocyclic carboxylic acids. The sulfaminic acid derivatives produced by this acylation reaction are then converted to the free amines by selective hydrolysis of the sulfaminic group, such hydrolysis may usually be produced by the action of concentrated sulfuric acid at room temperature.

(4) An arylamine may be treated with the halide of a heterocyclic carboxylic acid, as previously described in Method (1), forming an arylide of the heterocyclic carboxylic acid. This arylide may then be nitrated in an organic solvent such as acetic acid, or in a water suspension, resulting in the production of a nitro-arylide of the heterocyclic carboxylic acid. The nitro compound may then be reduced to the desired amine by well known processes such as those previously described.

It is apparent that the conditions under which this invention may be carried out are capable of considerable variation and modification, according to well known chemical principles. Due to the exceptionally large number of compounds which are comprised herein it is impossible to give herein hard and fast rules for every situation. Nevertheless, one skilled in the art should have no difficulty in producing any of these new aromatic amines according to the instructions previously given.

The products forming the subject matter of this invention are well adapted for use in the production of water-insoluble dyes and pigments. They produce, when diazotized and coupled with ice color coupling components, attractive shades of excellent fastness properties. Since many of the components coming within the scope of this invention are readily available it is obvious that these new amines may be more readily produced than numerous compounds used in the prior art to achieve similar results.

As many apparently widely different embodiments of this invention may be made without departing from the spirit and scope thereof, it is to

I claim:

1. The method which comprises reacting one of a group consisting of nitro-arylamines, azo-arylamines, and amino-aryl-sulfaminic acids free from water-solubilizing groups, in which aryl is of the benzene or naphthalene series, with one of a group of compounds consisting of the nuclear carboxylic acid halides of the heterocyclic compounds of the furane and thiophene series free from water-solubilizing groups, and converting the resulting product to the mono-acyl-diamine.

2. A process for producing water-insoluble organic compounds which comprises reacting an aromatic nitroamine selected from the group consisting of nitroamines of the benzene and naphthalene series with one of a group consisting of the nuclear acid halides of the heterocyclic compounds of the furane and thiophene series, and reducing the resulting product to the mono-acyldiamine.

3. A process for producing water-insoluble organic compounds which comprises reacting an aromatic nitro-amine of the benzene series with a nuclear acid halide of a heterocyclic compound of the furane series and reducing the resulting product to the mono-acyl-diamine.

4. A process for producing a water-insoluble organic compound which comprises reacting 4-nitro-2-5-dimethoxy-aniline with furoyl chloride, and reducing the nitro group of the resulting product to an amino group.

5. An organic compound represented by the formula: Z—CONH—Arylene—NH₂ in which Z represents one of the group consisting of the radicals of the heterocyclic compounds of the furane and thiophene series and in which Arylene is of the benzene or naphthalene series.

6. The compounds defined in claim 5 wherein the components designated by Z and Arylene are free from water-solubilizing groups.

7. Water-insoluble organic compounds having the following general formula:

Z—CONH—Arylene—NH₂ in which Z represents the monovalent radical of a heterocyclic compound of the furane and thiophene series and Arylene represents a divalent aromatic radical of the benzene and naphthalene series.

8. Organic compounds having the following general formula: Z—CONH—Arylene—NH₂ in which Z represents the monovalent radical of a heterocyclic compound of the furane series and Arylene represents a divalent radical of the benzene series.

9. A water-insoluble organic compound having in the form of free base the following formula:

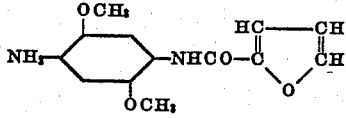

10. A water-insoluble organic compound having in the form of free base the following formula:

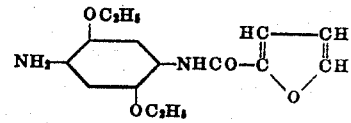

11. A process for producing an organic compound which comprises reacting a nitroarylamine of the general formula O₂N—R—NH₂, wherein R stands for a radical of the benzene or naphthalene series, with a furoyl halide of the general formula:

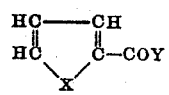

wherein X stands for oxygen while Y stands for a halogen atom, to give a compound of the general formula

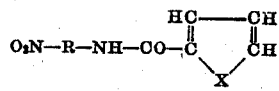

and reducing the latter to the corresponding diamine.

12. A compound of the general formula

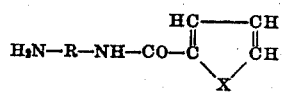

wherein R stands for a radical of the benzene or naphthalene series, and X stands for oxygen.

13. The process of producing an organic compound, which comprises reducing a nitro-arylamide of the general formula

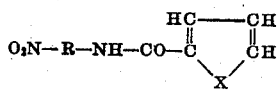

wherein R stands for a radical of the benzene or naphthalene series, and X stands for oxygen, to the corresponding amino-aryl-amide.

14. A process for producing an organic compound, which comprises reacting one of a group of compounds selected from the group consisting of nitro-aryl-amines, azo-aryl-amines and amino-aryl-sulfaminic acids, with one of the group consisting of the nuclear acid-halides of the heterocyclic compounds of the furane and thiophene series, and converting the resulting product to the corresponding mono-acyl-diamine.

15. A step in the process for producing an organic compound which comprises reacting one of a group of compounds selected from the group consisting of nitro-aryl-amines, azo-aryl-amines and amino-aryl-sulfaminic acids, with one of a group consisting of the nuclear acid halides of the heterocyclic compounds of the furane and thiophene series.

ROBERT E. ETZELMILLER.